Jan. 23, 1940.                S. M. FRIEDMAN                2,187,968
                           TRANSMISSION MECHANISM
                             Filed June 1, 1938
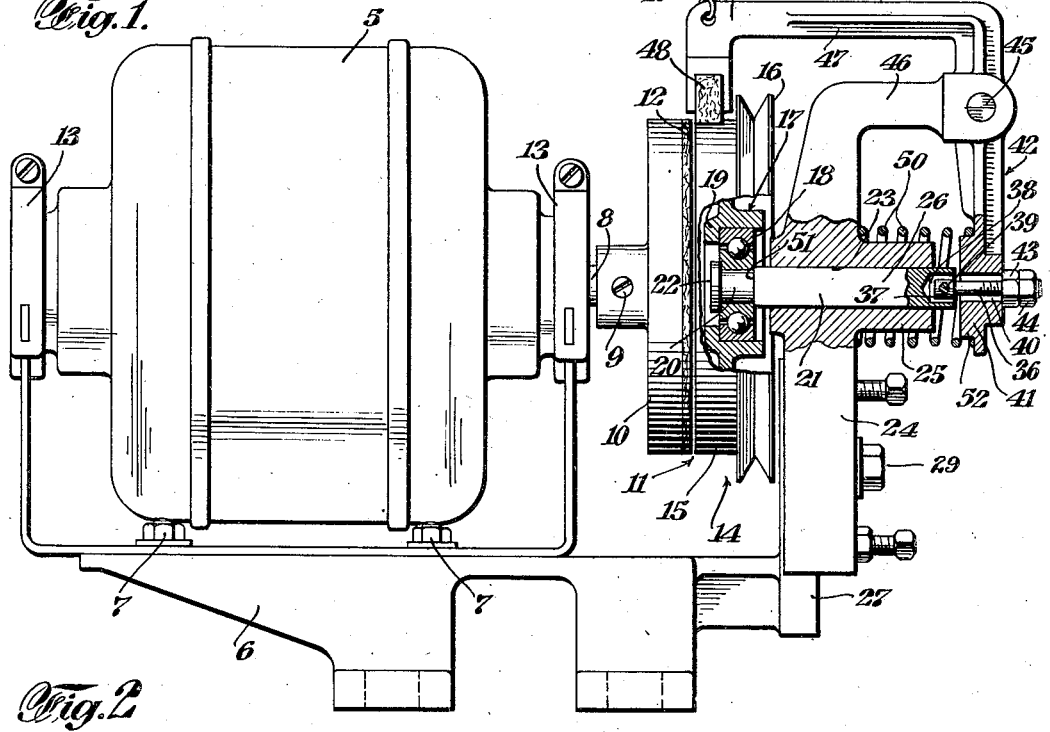
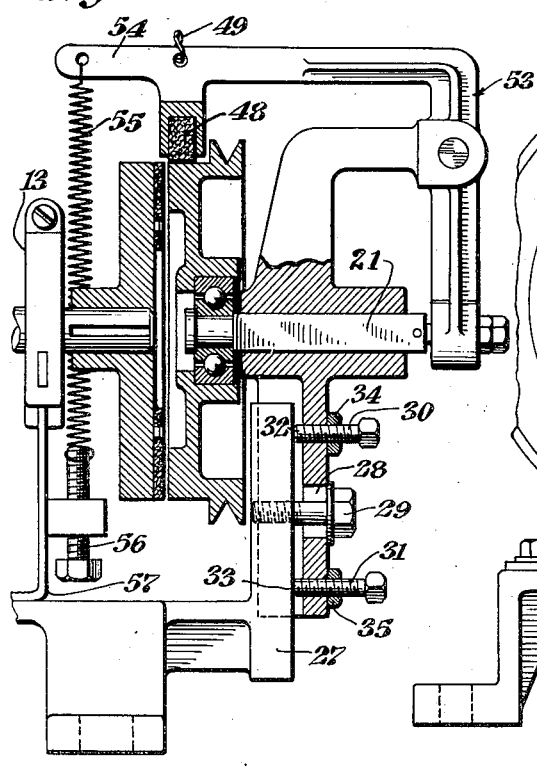
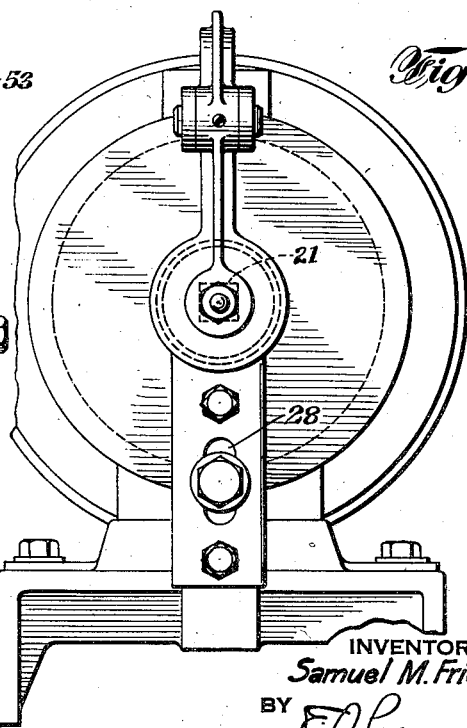
INVENTOR
Samuel M. Friedman
BY
ATTORNEY Patented Jan. 23, 1940

2,187,968

UNITED STATES PATENT OFFICE 2,187,968

TRANSMISSION MECHANISM

Samuel M. Friedman, Brooklyn, N. Y.

Application June 1, 1938, Serial No. 211,120

7 Claims. (Cl. 192—17)

This invention relates to transmission mechanisms, particularly of the type adapted for the intermittent transmission of power from a motor to a pulley member.

Among the numerous known transmission mechanisms is the type having a clutch arrangement the pulley element of which is rotatably mounted upon a non-revolvable slidably mounted shaft whereby, upon an operative movement of said shaft, the two complementary clutch elements are brought into operative engagement: and in devices of this category, the slidable shaft is commonly actuated by a member which is required to perform two functions, one being to effectuate the said slidable movement of the shaft and the other to prevent a rotation thereof, thereby frequently imposing an excessive strain upon the shaft-actuating member. It is primarily within the contemplation of my invention to overcome this shortcoming by relieving the shaft-actuating means of any tortional strain, and confining its work solely to that of effecting a sliding movement of the said shaft, thereby prolonging the life of the mechanism.

In this aspect of my invention it is a further object to provide unitary means for both holding said sliding shaft against rotation, and supporting it over a substantial portion of its extent, whereby a simple and sturdy device is presented in which the sliding shaft is maintained in true relation with the stationary portions of the structure.

Another object of my invention is to enable the various stationary and movable parts thereof to be readily adjusted and aligned with respect to each other.

Other objects, features and advantages will appear from the drawing and the description hereinafter given.

In the drawing:

Figure 1 is a side view of a form of my invention shown operably connected to a motor, a portion of the device being shown in section.

Figure 2 is a fragmentary sectional view of another form of my invention similar in every respect to the structure of Figure 1 except for the spring means urging the complementary clutch elements out of engagement, and Figure 3 is a front view of Figure 2.

Referring to the drawing, the motor 5 is suitably mounted upon the base 6, the bolt and nut arrangements 7 serving to adjustably secure the motor in place in a conventional manner well known in the art. The drive shaft 8 attached to the motor has fixedly mounted thereover, by means of the screw 9, the driving clutch disc 10 forming part of the clutch assembly 11, the operative face of said disc containing the friction lining 12. The drawing illustrates a hub clamp 13 suitably secured to the base 6 by means of the bolts 7 and being in supporting and clamping engagement with the front and rear hubs of the motor, in conventional manner. The pulley member 14 of the clutch assembly contains the disc 15 adapted for engagement with the lining 12, and the pulley 16, the latter being adapted for connection by a belt or similar means to any machine intended to be driven thereby.

The said pulley member contains an internal hollow hub 17 mounted upon a conventional ball-bearing assembly 18, the motor side of the hub preferably containing a flanged portion 19 in engagement with said ball bearing as illustrated. The said ball-bearing assembly is suitably mounted upon the reduced portion 20 of a non-revolvable slidably mounted shaft 21, the rear or motor terminal of said shaft containing a head 22 in abutting engagement with said bearing 18.

The said shaft 21 is slidably mounted within a suitable aperture 23 in the vertical support 24 which contains integral therewith a forwardly extending boss 25 serving as an additional support for said shaft 21. It will be noted that the shaft 21 is clearly non-circular in cross-section, Figure 1 disclosing a flat surface 26 of a preferably square shaft, whereby it is obviously prevented from rotating; and the aperture 23 is correspondingly shaped, so as to prevent a rotation of said shaft, it being of course understood that other non-circular cross sectional configurations of shaft 21 may be employed within the scope and intent of this invention.

The said support 24 has the vertical portion thereof preferably of channel shaped form, suitably fitting over the upright 27 forming an integral part of the base 6, the said upright serving to adjustably support the vertical arm 24 in a manner to be now set forth. Extending through the enlarged aperture 28 in support 24 is the bolt 29 which is in threaded engagement with upright 27. Adjusting screws 30 and 31 are in threaded engagement with support 24, the terminals 32 and 33 thereof, respectively, being in abutting engagement with the upright. It is thus obvious that by manipulating the screws 30 and 31, slight angular adjustments of the support 24 with respect to the upright 27 can be effected to produce a proper alignment between shafts 26 and 8. Thus, by a clockwise rotation of screw 30 and a counterclockwise rotation of screw 31, the support 24 can be made to adjustably move slightly in a clockwise direction around bolt 29 as an axis. The lock nuts 34 and 35 hold the said screws 32 and 33 respectively in fixed relative position with respect to the upright 27 and support 24, and the aperture 28 permits the adjusting movement. It is of course obvious that by properly manipulating bolt 29 the support 24 can be either adjustably moved or entirely removed.

Pivotally attached to the front terminal of shaft 21, that is to the terminal most remote from the motor, is the bolt 36 the square head 37 thereof being loosely positioned within the recessed portion 38 of the shaft 21, the pivotal pin being at 39. Said bolt 36 extends through a slightly enlarged aperture 40 in the terminal portion 41 of lever 42, the bolt 36 being held in place by the nuts 43 and 44.

The said lever 42 is pivotally mounted at 45 upon the arm 46 of support 24, the rear arm 47 of the lever containing at the extreme terminal thereof the brake 48 operatively engageable with the disc 15 of pulley member 14. Suitably connected to the lever 42 preferably at said arm 47 thereof is the link 49, this in turn being connected to suitable actuating means whereby the link 49 can be pulled upwardly in the direction of the arrow by any conventional means not shown in the drawing but well known in the art.

By referring to Figure 1 it will be noted that a spring 50 is mounted upon the boss 25 to support 24, said spring being remote and out of engagement with shaft 21 but in constant engagement with lever 42 to urge it outwardly away from the motor, for purposes to be hereinafter more fully described.

In the operation of this device, the said spring 50 normally urges the lower arm of lever 42 outwardly, as aforesaid, whereby the arm 47 thereof is pivoted downwardly to bring the brake 48 against disc 15, thereby holding the pulley member 14 against rotation. The same action of spring 50 also causes the terminal portion 41 to bear outwardly against the nuts 43 and 44, thereby causing a corresponding movement of the bolt 36 and the entire slide shaft 21 through the connection of pin 39. This movement will obviously cause the bearing assembly 18 to move in the same direction, due to the action of head 22 thereagainst; and inasmuch as the hub 17 of pulley member 14 is mounted upon bearing 18, such a movement will cause the entire pulley member to move to the right and out of engagement with the lining 12 of the drive member 10 of the clutch. It is thus apparent that under normal conditions, the spring 50 is instrumental in keeping the pulley member 14 out of operative engagement with the driving portion 10 of the motor, and in holding it against any rotation by the action of brake 48.

When it is desired to cause an operative rotation of pulley member 14 the link 49 is raised, causing the lever 42 to rotate about the axis 45, in this manner not only removing the brake 48 from engagement with disc 15, but also causing the terminal portion 41 of the lever to come into engagement with the adjacent terminal of shaft 21, and slidably move it inwardly towards the motor. The shaft 21 contains, at its juncture with the reduced portion 20 thereof, the shoulder 51 in abutment with the bearing 18, so that upon an inward operative movement of said shaft 21, the bearing assembly 18 together with the entire pulley member 14 will be correspondingly moved inwardly until the disc 15 is in operative engagement with the lining 12. At this point, the rotary movement of driving disc 20, through the action of motor 5, is transmitted to the pulley member 14 whereby it can smoothly rotate upon bearing 18 to transmit its power to any mechanism operatively connected therewith. When said upward pull at link 49 is released, the parts will be instantaneously brought back into their normal inoperative positions due to the action of spring 50, the brake 48 serving to instantly stop any rotation of pulley member 14 that may be due to its fly-wheel action.

Inasmuch as the terminal 41 of lever 42 takes a slight arcuate path during its operative movement, a correspondingly slight movement of bolt 36 with respect thereto and to the shaft 21 will take place, this movement being freely permitted due to the enlarged apertures 38 and 40 and the pivotal connection 39.

It will be further observed that the terminal 41 of lever 42 serves but a single purpose, namely that of moving the shaft 21 inwardly and outwardly,—and being entirely free from any torsional strain or additional burden. The shaft 21 is held against rotation entirely independently of the action of terminal 41, inasmuch as its plane surfaces such as 26 permit only a slidable longitudinal movement thereof.

It is of prime importance in a device of this nature that the shaft 21 be securely maintained in proper predetermined position, so as to enable the contacting surfaces of disc 15 and lining 12 to be absolutely parallel to each other. In order to accomplish this objective, I have provided the support 24 with the extended hub 25 as aforesaid, thereby providing a support for the shaft over a substantial portion thereof.

The spring 50 is deliberately kept remote from shaft 21, so as to give it absolute freedom of action without any interference by another moving element such as the shaft 21. To effectively maintain this remote relationship, the spring is mounted and supported solely upon the boss 25 and the boss 52 of the said terminal 41 of lever 42.

In Figure 2 is shown an arrangement identical in every respect with that shown in Figure 1, a new lever 53, however, being substituted in place of the lever 42. This lever differs from the lever of Figure 1 in that the terminal thereof adjacent the brake 48 contains an extension 54 thereon, the spring 55 being suitably attached thereto, and anchored upon a bolt 56 secured to the mount 57 of the hub clamp 13. In this manner it is apparent that the spring 55 constantly urges the brake 48 into engagement with the pulley member 14, at the same time keeping the pulley member out of engagement with the driving disc 10 of the clutch. The arrangement is such as not only to keep the spring 55 completely remote and out of any possible engagement with shaft 21, but also to enable the tension in spring 55 to be regulated by an operative manipulation of bolt 56.

It is of course understood that the various embodiments above described and shown in the drawing are illustrative of my invention and not employed by way of limitation, inasmuch as numerous changes and modifications may be made within the scope of the appended claims without departing from the spirit of this invention.

What I claim is:

1. In a transmission mechanism, a drive shaft, a clutch assembly containing a driving plate and a pulley member, a support, a slidable shaft slidably mounted within said support and in operative engagement therewith for substantially its entire length, means associated with said support for holding said slidable shaft against rotation, said plate being affixed to said drive shaft and said pulley member being rotatably mounted upon said slidable shaft, a lever pivotally mounted upon said support and having one terminal thereof provided with brake means engageable with the pulley member, the other terminal of the lever being engageable with and pivotally connected to the adjacent terminal of said slidable shaft, and spring means remote from said slidable shaft and in constant engagement with said lever, whereby the said brake on the lever is normally in engagement with the pulley member and the opposite terminal of the lever normally holds, through its said pivotal connection, the slidable shaft and the pulley member thereon in their inoperative positions; the support containing a boss portion and a hole in axial alignment with said drive shaft and adapted to slidably accommodate said slidable shaft, the spring means comprising a helical spring mounted over said boss and in abutment with said lever.

2. In a transmission mechanism, a drive shaft, a clutch assembly containing a driving plate and a pulley member, a support, a slidable shaft slidably mounted within said support and in operative engagement therewith for substantially its entire length, means associated with said support for holding said slidable shaft against rotation, said plate being affixed to said drive shaft and said pulley member being rotatably mounted upon said slidable shaft, a lever pivotally mounted upon said support and having one terminal thereof provided with brake means engageable with the pulley member, the other terminal of the lever being engageable with and pivotally connected to the adjacent terminal of said slidable shaft, and spring means remote from said slidable shaft and in constant engagement with said lever, whereby the said brake on the lever is normally in engagement with the pulley member and the opposite terminal of the lever normally holds, through its said pivotal connection, the slidable shaft and the pulley member thereon in their inoperative positions; the support containing a boss portion and a hole in axial alignment with said drive shaft and adapted to slidably accommodate said slidable shaft, the terminal of the lever adjacent the slidable shaft having a boss extending towards said first-mentioned boss, the said spring means comprising a helical spring mounted over both of said bosses.

3. In a transmission mechanism, a drive shaft, a clutch assembly containing a driving plate and a pulley member, a support, a slidable shaft slidably mounted within said support and in operative engagement therewith for substantially its entire length, means associated with said support for holding said slidable shaft against rotation, said plate being affixed to said drive shaft and said pulley member being rotatably mounted upon said slidable shaft, a lever pivotally mounted upon said support and having one terminal thereof provided with brake means engageable with the pulley member, the other terminal of the lever being engageable with and pivotally connected to the adjacent terminal of said slidable shaft, and spring means remote from said slidable shaft and in constant engagement with said lever, whereby the said brake on the lever is normally in engagement with the pulley member and the opposite terminal of the lever normally holds, through its said pivotal connection, the slidable shaft and the pulley member thereon in their inoperative positions; the slidable shaft being of non-circular cross-section, the support containing a hole of cross-sectional configuration corresponding to that of said slidable shaft to hold said latter shaft against rotation and permit slidable movement thereof, said hole being in substantial axial alignment with said drive shaft.

4. In a transmission mechanism, a drive shaft, a clutch assembly containing a driving plate and a pulley member, a support, a slidable shaft slidably mounted within said support and in operative engagement therewith for substantially its entire length, means associated with said support for holding said slidable shaft against rotation, said plate being affixed to said drive shaft and said pulley member being rotatably mounted upon said slidable shaft, a lever pivotally mounted upon said support and having one terminal thereof provided with brake means engageable with the pulley member, the other terminal of the lever being engageable with and pivotally connected to the adjacent terminal of said slidable shaft, and spring means remote from said slidable shaft and in constant engagement with said lever, whereby the said brake on the lever is normally in engagement with the pulley member and the opposite terminal of the lever normally holds, through its said pivotal connection, the slidable shaft and the pulley member thereon in their inoperative positions; the slidable shaft being of square cross-section, the support containing a hole of square cross-sectional configuration corresponding to that of said slidable shaft to hold said latter shaft against rotation and permit slidable movement thereof, said hole being in substantial axial alignment with said drive shaft.

5. In a transmission mechanism, a drive shaft, a clutch assembly containing a driving plate and a pulley member, a support, a slidable shaft slidably mounted within said support and in operative engagement therewith for substantially its entire length, means associated with said support for holding said slidable shaft against rotation, said plate being affixed to said drive shaft and said pulley member being rotatably mounted upon said slidable shaft, a lever pivotally mounted upon said support and having one terminal thereof provided with brake means engageable with the pulley member, the other terminal of the lever being engageable with and pivotally connected to the adjacent terminal of said slidable shaft, and spring means remote from said slidable shaft and in constant engagement with said lever, whereby the said brake on the lever is normally in engagement with the pulley member and the opposite terminal of the lever normally holds, through its said pivotal connection, the slidable shaft and the pulley member thereon in their inoperative positions; further provided with a motor mounting containing an upright thereon, the said support being slidably engageable therewith for vertical adjustment, bolt means securing said support to said upright, and an upper and a lower screw in threaded engagement with said support and abuttable with said upright for varying the angular disposition of said support with respect to the upright.

6. In a transmission mechanism, a drive shaft, a clutch assembly containing a driving plate and a pulley member, a support, a slidable shaft slidably mounted within said support and in operative engagement therewith, said plate being affixed to said drive shaft and said pulley member being rotatably mounted upon said slidable shaft, a lever pivotally mounted upon said support and having one terminal thereof provided with brake means engageable with the pulley member, the other terminal of the lever being engageable with and pivotally connected to the adjacent terminal of said slidable shaft, means independent of the lever for holding said slidable shaft against rotation, said pivotal connection comprising a recessed portion in the terminal of the slidable shaft, a bolt having a head portion loosely contained within and pivotally attached to said recessed portion, the adjacent terminal of the lever containing an enlarged aperture through which the shank of said bolt loosely extends, and nut means holding said bolt operatively engageable with said lever, the lever normally being out of engagement with the slidable shaft and operatively abuttable therewith to cause an operative sliding movement thereof, and spring means in operative engagement with the lever to normally hold the brake thereon in engagement with the pulley member and the opposite terminal of the lever in its inoperative position.

7. In a transmission mechanism, the combination according to claim 6, the rotatable mounting for the pulley comprising a ball-bearing assembly operatively supported upon said slidable shaft, the bearing supporting portion of said latter shaft being of reduced proportions providing front and rear abutments in engagement with the bearing assembly whereby it is operatively movable with said slidable shaft.

SAMUEL M. FRIEDMAN.